US 6,648,424 B2

(12) United States Patent
Vaughn (10) Patent No.: US 6,648,424 B2
(45) Date of Patent: Nov. 18, 2003

(54) BRAKE SYSTEM WITH GRADUATED EMPTY/LOAD

(75) Inventor: Lawrence E. Vaughn, Watertown, NY (US)

(73) Assignee: New York Air Brake Corporation, Watertown, NY (US)

( * ) Notice: Subject to any disclaimer, the term of this patent is extended or adjusted under 35 U.S.C. 154(b) by 33 days.

(21) Appl. No.: 10/108,365

(22) Filed: Mar. 29, 2002

(65) Prior Publication Data

US 2003/0184148 A1 Oct. 2, 2003

(51) Int. Cl.[7] .................................................. B60T 8/18
(52) U.S. Cl. ...................................... 303/22.2; 303/22.6
(58) Field of Search .......................... 303/22.5, 22.1, 303/22.7, 9.67, 22.2–22.6, 22.8, 3, 7

(56) References Cited

U.S. PATENT DOCUMENTS

| 3,285,674 A | 11/1966 | Eaton |
| 3,606,485 A | 9/1971 | Scott |
| 3,671,086 A | 6/1972 | Scott |
| 3,910,639 A | 10/1975 | Engle |
| 3,927,916 A | 12/1975 | Masuda |
| 3,929,384 A | 12/1975 | Larsen |
| 3,936,097 A | 2/1976 | Yanagawa et al. |
| 4,045,094 A | 8/1977 | Yanagawa et al. |
| 4,080,005 A | 3/1978 | Engle |
| 4,444,439 A | 4/1984 | Fauck et al. |
| 4,453,777 A | 6/1984 | Newton |
| 4,453,779 A | 6/1984 | Bridigum |
| 4,597,610 A | 7/1986 | Stumpe |
| 4,653,812 A | 3/1987 | Engle |
| 4,692,867 A | * 9/1987 | Poole ............................. 303/3 |
| 4,844,554 A | 7/1989 | Rojecki |
| 5,005,915 A | 4/1991 | Hart et al. |
| 5,106,168 A | 4/1992 | McKay |
| 5,211,450 A | 5/1993 | Gayfer et al. |
| 5,662,389 A | * 9/1997 | Truglio et al. .................. 303/7 |
| 5,820,226 A | * 10/1998 | Hart .............................. 303/7 |
| 6,095,621 A | * 8/2000 | Wood et al. ............... 303/22.6 |
| 6,120,109 A | * 9/2000 | Wood et al. ............... 303/22.6 |

* cited by examiner

Primary Examiner—Jack Lavinder
Assistant Examiner—Melanie Torres
(74) Attorney, Agent, or Firm—Barnes & Thornburg (57) ABSTRACT

A load sensing system for a rail car brake system, including at least two load sensing devices connected in series. The first load sensing device receives a brake signal from the brake control valve and provides a first braking signal for loads above a first value. It provides a second braking signal less than the first braking signal for loads below the first load value. The second load sensing device receives the first and second braking signals from a first load sensing device. It provides a third braking signal to the brake cylinder for loads above the second value and different from the first value and a fourth braking signal less than the third braking signal for loads below the second value. For loads above the first and second load values, the first and third braking signals are equal to the brake signal. For loads above the second value, the third braking signal is equal to the received first or second braking signal.

12 Claims, 8 Drawing Sheets

BRAKE SYSTEM WITH GRADUATED EMPTY/LOAD

BACKGROUND AND SUMMARY OF THE INVENTION

The present invention relates generally to load sensing devices for train brakes and, more specifically, to a graduated load sensing system.

Figure 1:
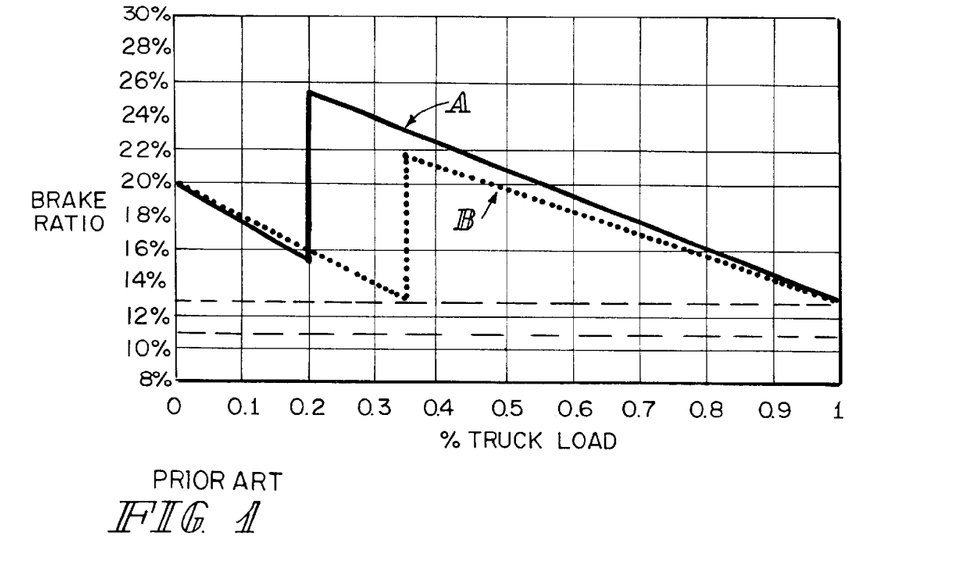
FIG. 1 is a graph of the percentage of truck brake to brake ratios for prior art empty/load devices.

Load sensing devices are known in the freight industry as "empty/load valves." These are valves that generally provide 100 percent of the brake signal from the brake control valve to the brake cylinder for loads above a pre-selected load value and reduces the brake signal value by a given percentage as a function of the empty/load valve design for loads below the pre-selected load value. A typical example is found in U.S. Pat. No. 5,211,450 and is available from New York Air Brake Corporation. The typical example described in the '450 Patent is a Model E/L 60. When the car load is below 20 percent of a loaded car, 60 percent of the value of the brake signal is provided to the brake cylinder. A graph showing the brake ratio versus percentage or truck load is illustrated in FIG. 1. Graph A is for a 60 percent valve at a 20 percent of load switchover. Graph B is a 60 percent valve at a 35 percent of load switchover. The empty truck weight is 42,000 pounds, and the loaded truck weight is 107,000 pounds. This is for a lever ratio of 4.75:1 and a brake cylinder with an 8.5-inch diameter. For the 20 percent of load switchover, the brake ratio varies between approximately 15.5 percent to 22.5 percent brake ratio. The empty/load valve with a 35 percent changeover varies between 12.8 percent brake ratio and 21.5 percent brake ratio. It is desirable to have an empty load or load sensing device with a smaller variation of brake ratio over the range of loads.

The present invention provides a load sensing system for a rail car brake system, including at least two load sensing devices connected in series. The first load sensing device receives a brake signal from the brake control valve and provides a first braking signal for loads above a first value. It provides a second braking signal less than the first braking signal for loads below the first load value. The second load sensing device receives the first and second braking signals from a first load sensing device. It provides a third braking signal to the brake cylinder for loads above the second value and different from the first value and a fourth braking signal less than the third braking signal for loads below the second value. For loads above the first and second load values, the first and third braking signals are equal to the brake signal. For loads above the second value, the third braking signal is equal to the received first or second braking signal.

Thus, for loads above the first and second load values, the full brake signal from the control valve is provided as a braking signal of the cylinder. For loads below both the first and second load values, both load sensing devices provide their smaller signals. For loads between the first and second values, only one of the devices is providing the full brake signal, and the other device provides a smaller signal.

Additional load sensing devices may be connected in series with the first and second load sensing devices between the brake control valve and the brake cylinder. They would all have separate load values at which they switch.

Each of the load sensing devices may have a separate load sensing element, or they may have a common load sensing element. Load sensing devices may be in separate or in common housings. The ratio of the two load sensing devices may be equal or different.

The present invention is also a method of assembling a brake system for a rail vehicle, including selecting first and second load sensing devices having different load values. The first load sensing device is connected to receive brake signals from the control valve and to provide a first braking signal for loads above a first value and a second braking signal less than the first braking signal for loads below the first value. The second load sensing device is connected to receive first and second braking signals from the first sensing device. It also provides a braking signal to the brake cylinder for loads above a second value and a fourth braking signal less than the third braking signal for loads below the second load value.

These and other aspects of the present invention will become apparent from the following detailed description of the invention, when considered in conjunction with accompanying drawings.

DETAILED DESCRIPTION OF THE PREFERRED EMBODIMENTS

Figure 3:
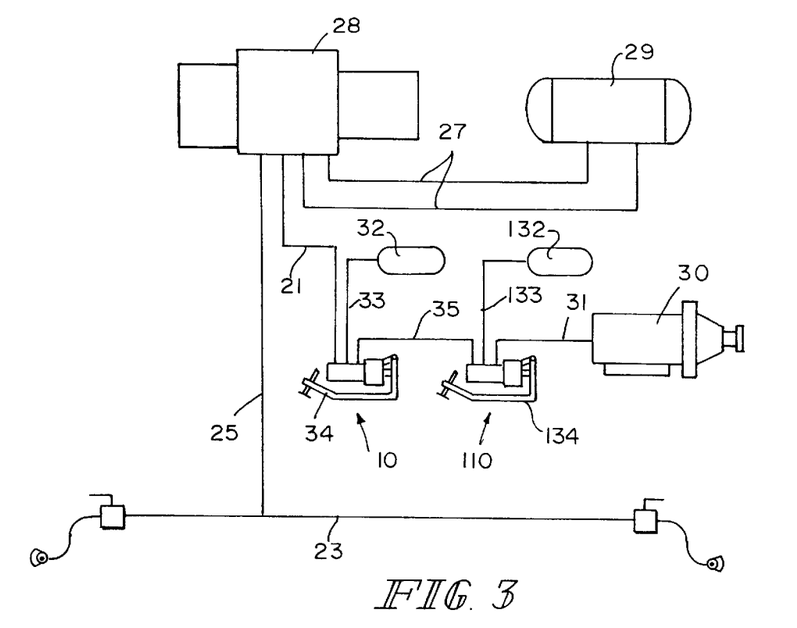
FIG. 3 is a schematic of a brake system for a rail vehicle incorporating a load sensing system, including two load sensing devices, according to the principles of the present invention.

A brake system incorporating the present invention as illustrated in FIG. 3. It includes a pair of load sensing empty/load devices 10, 110 connected in series. A brake control valve 28, for example, a DB60 available from New York Air Brake Corporation, is connected to the brake line 23 by a line 25. A reservoir 29 may be, for example, a combined emergency and service reservoir individually connected by a pair of lines 27 to the brake control valve 28. A brake signal for the brake cylinder 30 is provided on line 21 to the series-connected empty/load devices 10, 110. A brake control valve 28 monitors the pressure of the brake pipe 23 and provides appropriate brake signal on line 21. Each of the empty/load devices 10, 110 includes an equalization reservoir 32, 132 connected by lines 33, 133, respectively. The brake signal from control valve 28 is provided as an input to the first empty/load device 10. The output of the empty/load device 10 is connected by a line 35 as an input to the second empty/load device 110. The output of the empty/load device 110 is provided on line 31 to the brake cylinder 30.

The empty/load devices 10, 110 are selected to have different load values, or switching points, at which they change their output signals. Using FIG. 3 as an example in that the first empty/load device 10 has a changeover point at 15 percent of load, the second empty/load device 110 has a changeover point at 50 percent of load and both have a signal of an empty to load ratio of 60 percent. When the load is above 50 percent, both devices 10, 110 are at 100 percent. Thus, 100 percent of the brake signal from the brake control valve 28 is provided to the cylinder 30. When the car is loaded between 15 and 50 percent of its load, the empty/load device 110 has switched to its 60 percent ratio while the empty/load device 110 is still at 100 percent. Thus, the brake signal from the brake control valve 28 is provided 100 percent on line 21, 100 percent on line 35 from the output of the first empty/load device 110 and 60 percent on line 31 to the brake cylinder 30. When the car is loaded below 15 percent, both of the empty/load devices 10, 110 have switched to their 60 percent value. Thus, the 100 percent brake signal from the control valve 28 on line 21 is provided as a 60 percent signal on line 35 from empty/load device 110. The empty/load device 110 reduces the 60 percent signal by another 60 percent providing a 36 percent signal on line 31 to the brake cylinder 30.

It should be noted that this is merely an example to explain the operation and function of the load sensing system provided by the empty/load devices 10, 110 in series. The empty/load devices 10, 110 may have different percentage load switching points and may have different percentages of empty to load. It should also be noted that the same results would occur by reversing the switch points such that empty/load device 10 could have the higher switchover percentage of load versus empty/load device 110. For example, the device 10 could be a 70 percent ratio, and device 110 a 60 percent ratio. Assuming the 70 percent ratio device switches first, the input signal into the brake cylinder 30 would go from 100 percent to 70 percent. Below the second trip point of the 60 percent ratio device, the signal would go from 70 percent to 42 percent. If the order of switching was reversed, the signal to the brake cylinder 30 would be 100 percent, 60 percent and 42 percent.

Figure 2:
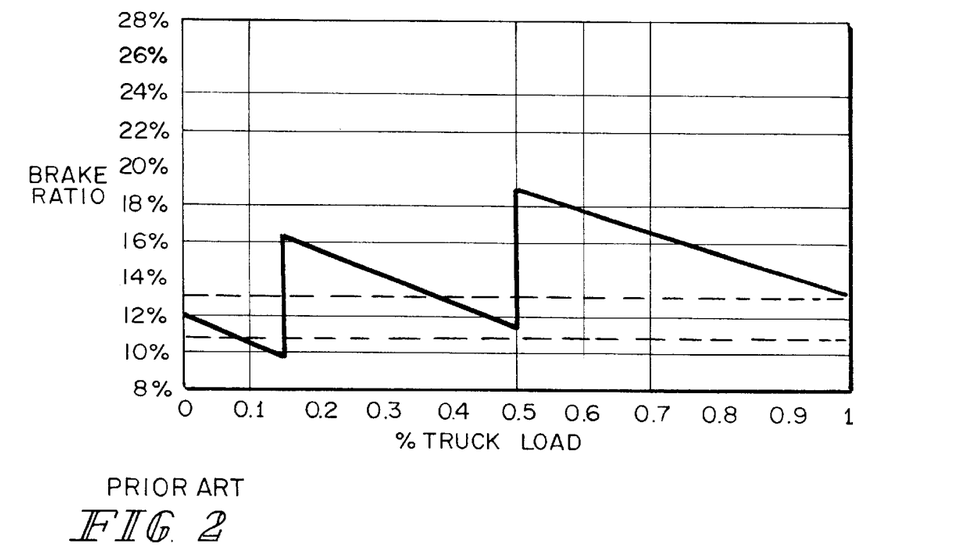
FIG. 2 is a graph of the percentage of truck load to brake ratio of the load sensing system, according to the principles of the present invention.

By way of an example and for a point of comparison to the signal devices of FIG. 1, one of the changeover devices 10, 110 is selected to have a switching point at 15 percent of load, and the other is selected to have a switching point at 50 percent of load. Also, both of the devices are selected to have a ratio of 60 percent between a light load and a heavy load output signal. FIG. 2 shows the graph using the same car and rigging and size brake cylinder as FIG. 1. The brake ratio moves between approximately 10 and 19 percent. This is, substantially, a smaller values than that of FIG. 1.

Figure 4:
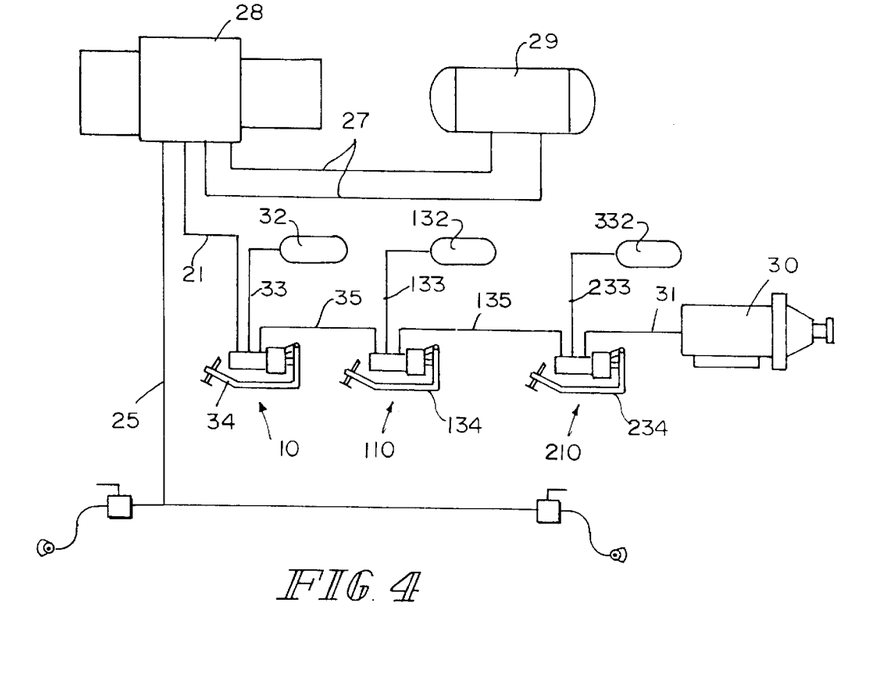
FIG. 4 is a schematic of a brake system for a rail vehicle incorporating a load sensing system, including three load sensing devices, according to the principles of the present invention.

By providing more than two load sensing or empty/load devices, the band would further narrow. FIG. 4 illustrates the use of three series-connected empty/load or load sensing devices. In addition to empty/load devices 10, 110, a third empty/load device 210 is provided. The output of the empty/load device 110 is connected through line 135 to the input of empty/load device 210 having an equalization reservoir 332. The output of the last empty/load device 210 is connected via a line 31 to the brake cylinder 30.

It should be noted that the empty/load devices 10, 110, 210 illustrated in FIGS. 3 and 4 are industry standard devices and are merely connected in series. Thus, no special equipment is needed to produce the results of FIG. 2 or to take advantage of the present invention. Empty/load devices that are presently available in the marketplace have ratios of 60 percent, 50 percent and 40 percent. Although not presently available, a 70 percent empty/load device could be developed and used. Thus, the ratios of the percentage signal provided to the brake cylinder can vary at the high end from 40–70 percent and at the low end from 16–49 percent by appropriately selecting and mixing these two empty/load devices. Adding a third empty/load device, as illustrated in FIG. 4, will provide three levels less than 100 percent with the appropriate spread of percentages.

Although the description so far has described the use of the E/L 60 empty/load device available from New York Air Brake, it may be any empty/load device, for example, SC-1 and ELX.

Although FIGS. 3 and 4 indicate each of the empty/load devices 10, 110, 210, each have their own load sensing element or lever arm 34, 134, 234, respectively. They are also in distinct and independent housings. These embodiments use pre-existing empty/load devices. There is no special equipment.

Figure 5:
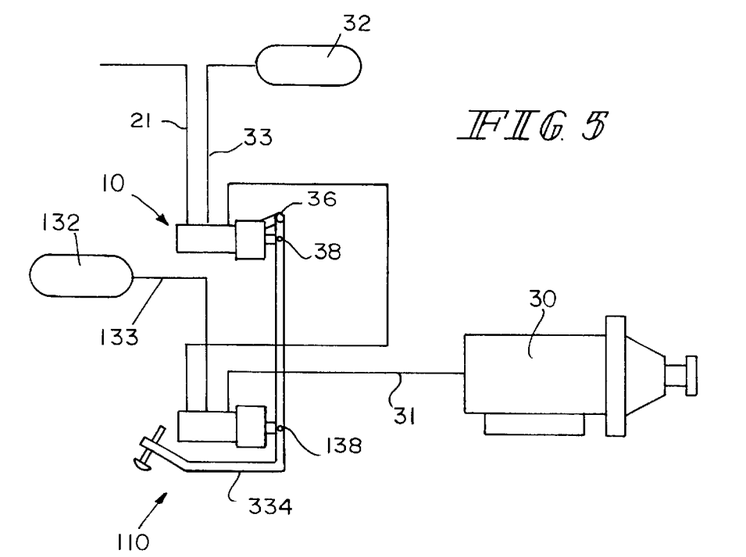
FIG. 5 is a schematic of a brake system for a rail vehicle incorporating a load sensing system, including two load sensing devices with a common actuator, according to the principles of the present invention.
Figure 6:
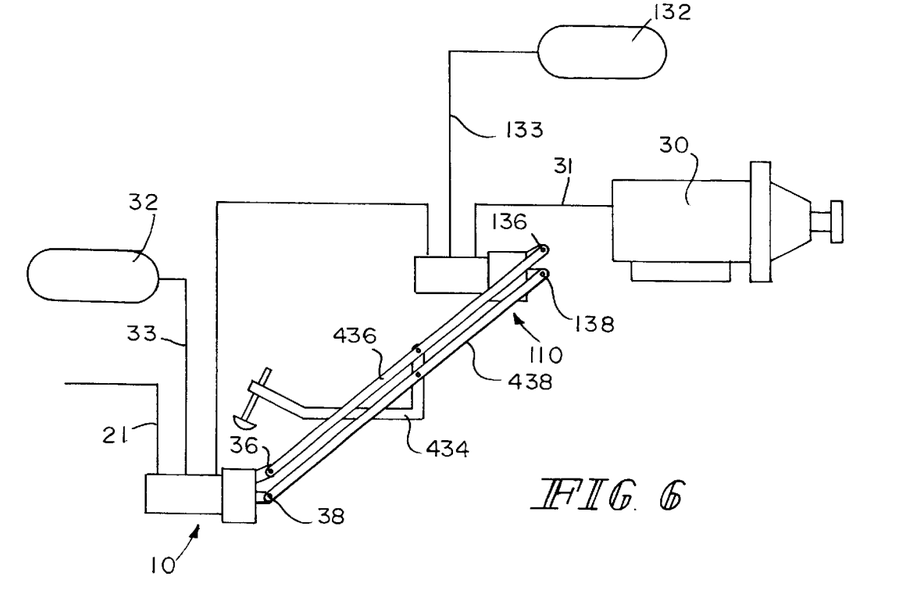
FIG. 6 is a schematic of a brake system for a rail vehicle incorporating a load sensing system, including two load sensing devices with another common actuator, according to the principles of the present invention.

FIG. 5 illustrates a pair of empty/load devices 10, 110 having a common load sensing element or lever 334 pivoting about pivot point 36 on empty/load device 10 and connected to a piston at 38 and 138, respectively. Another alternative is illustrated in FIG. 6 where a single common load sensing device 434 is connected between each of the empty/load devices 10, 110.

Rod 436 is connected between the pivot points 36, 136 and supports the pivot of the common load sensing element 434. Rod 438 interconnects the movable part of load sensing element 434 to the pivotal connection 38, 138 of the empty/load devices 10, 110, respectively. FIGS. 5 and 6 are just examples of a pair or more of empty/load devices connected in series in separate housings and having a common load sensing element.

FIGS. 7–10 show a cross-section of a pair of series-connected empty/load devices in a common housing with a common load sensing element.

An empty/load device 510 having two load sensing devices in a common housing 512 and a common load sensing element of lever 534 is shown in FIGS. 7–10. The device 510 is shown in the "release" position in FIG. 7. There is no pressure on the control valve port 520, which allows the spring 544 to move the sensing piston 542 to the right forcing the valve elements 556, 656 and cages 560, 660 into contact with retainers 562, 662 forcing the ratio pistons 548, 648 into abutment with the interior end face of the bores 566, 666.

Figure 7:
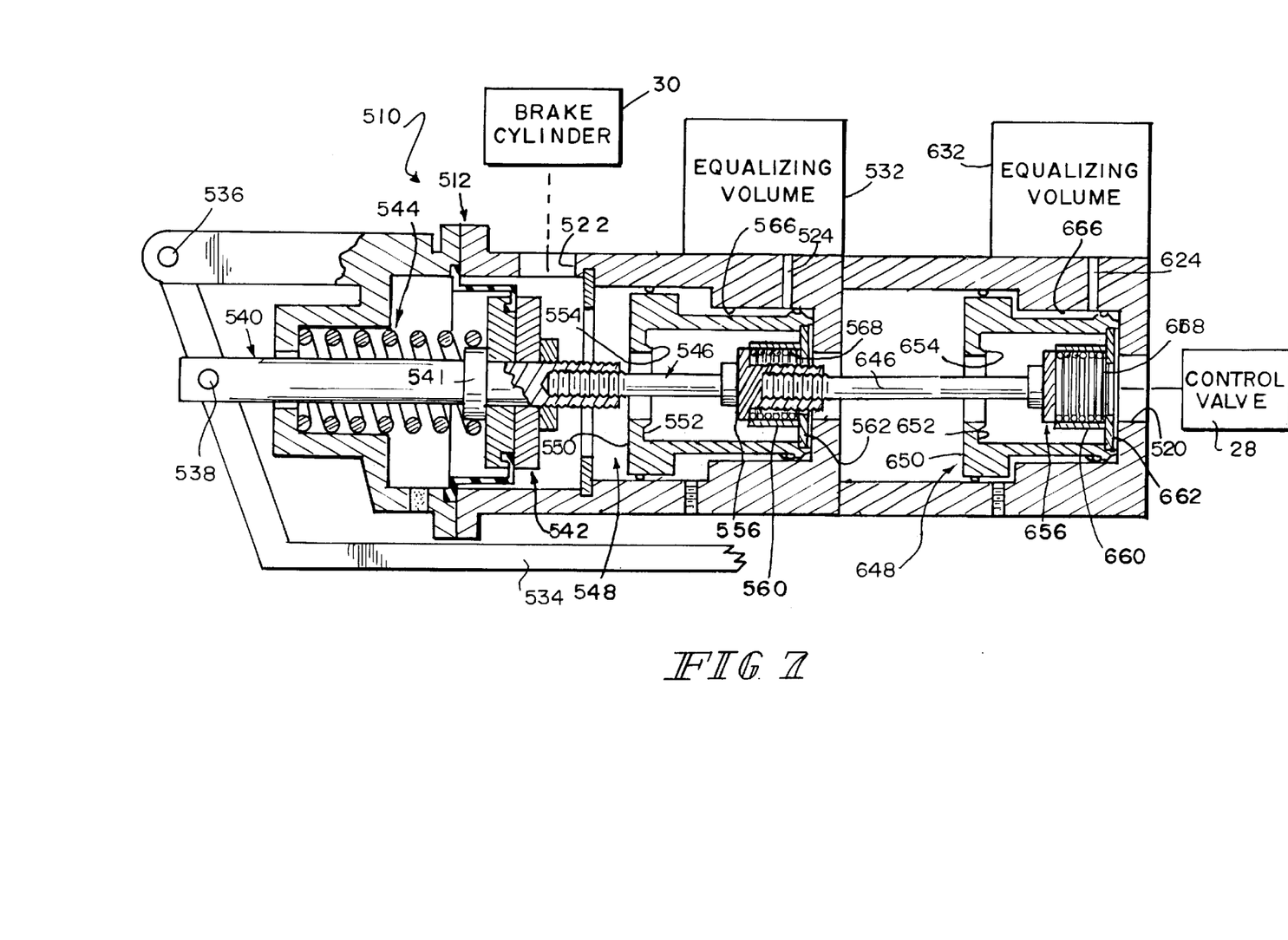
FIG. 7 is a cross-sectional view of another embodiment of an empty/load device incorporating the principles of the present invention in the release position.

The sensing lever 534 is secured to the body 512 at 536, and the sensing piston 542 via push rod 540 operates to position the sensing piston 542 in response to load conditions on the rail car. Depending upon the value of the load, the device 510 will either pass the brake signal from control valve 28 through unproportioned to the brake cylinder 30 or proportion the signal through the ratio pistons 548, 648. This empty/load device 510 is but one example and is explained in detail in U.S. Pat. No. 5,211,450 for a single ratio piston.

When control valve 28 provides a pressure signal, valving elements 556, 656 are displaced from seats 554, 654, and the brake cylinder port 522 is connected to the control port 520 through the ratio pistons 548, 648. As the brake signal from the control valve 28 builds up in the brake cylinder 30, the pressure on sensing piston 542 moves the piston 542 to the left extending the load sensing lever 534 to the left and into engagement with the car or other element which indicates the degree of load.

Figure 8:
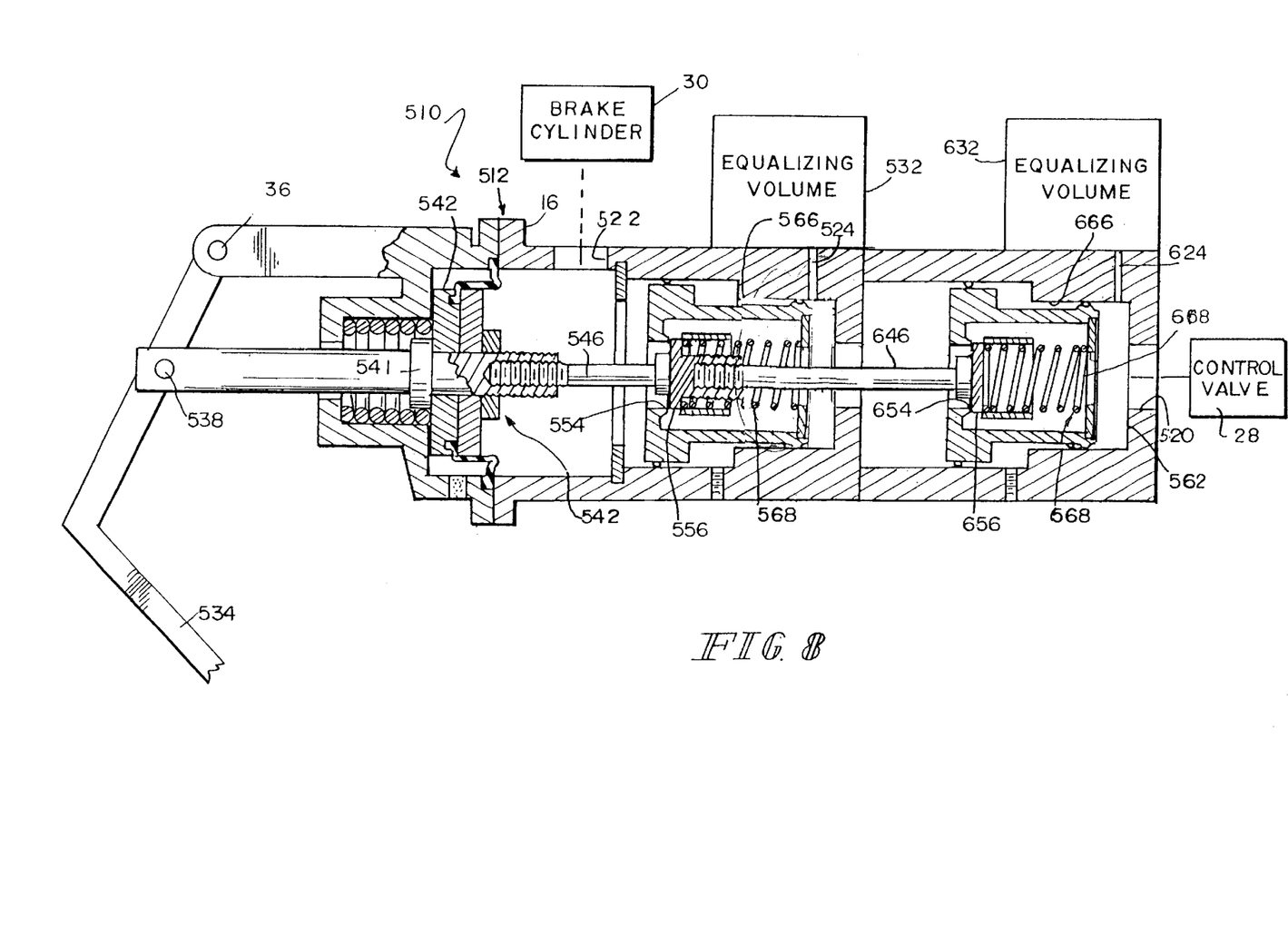
FIG. 8 shows the valve of FIG. 7 in the empty position.

For an empty car, as illustrated in FIG. 8, the sensing piston 542 comes to rest after bringing the valving elements 556, 656 into engagement with the seats 554, 654 and moving the ratio pistons 548, 648 to the left. Thus, both load sensing devices or ratio pistons 548, 648 proportion the brake signal. Thus, the brake cylinder for control valve 28 is proportioned by the product of ratio pistons 548 and 648. In both instances, the equalizing volume ports 524, 624 are connected on the control valve side for the equalization reservoirs 532, 632. The springs 568, 668 keep the valve element 556 following the actuator rods 546, 646. As is well known in the prior art, the ratio of each of the ratio pistons 548, 648 is the ratio of the face 552, 652 to face 550, 650.

Figure 9:
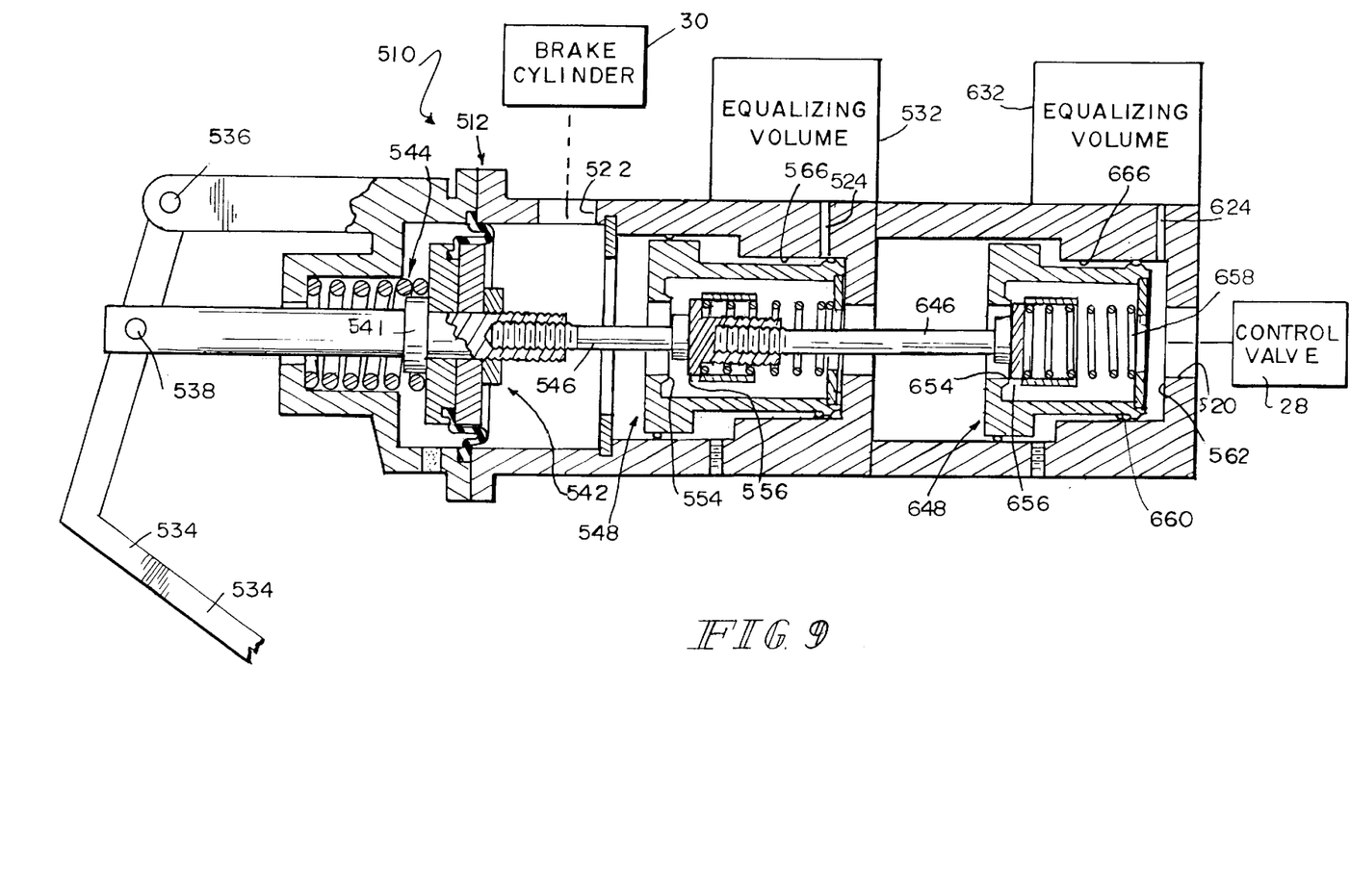
FIG. 9 shows the valve of FIG. 7 at the first switch point.

When the loading condition of the car is such that it is above the switchover point of the proportioning piston 648 but below that of piston 548, only piston 648 acts as a proportioning piston. This is illustrated in FIG. 9. Valve element 656 rests on valve seat 654. Valving element 556 is displaced from valve seat 554. The sensing piston 542 is displaced from the end of the housing and is stopped once the load sensing lever 534 comes to rest. In this condition, the brake signal from control valve 28 is only proportioned by the ratio of the ratio piston 648, and that value is transmitted through the opening valve of proportioning the ratio piston 548 to the brake cylinder 30. Only the equalizing chamber 632 is connected to the brake signal pressure.

Figure 10:
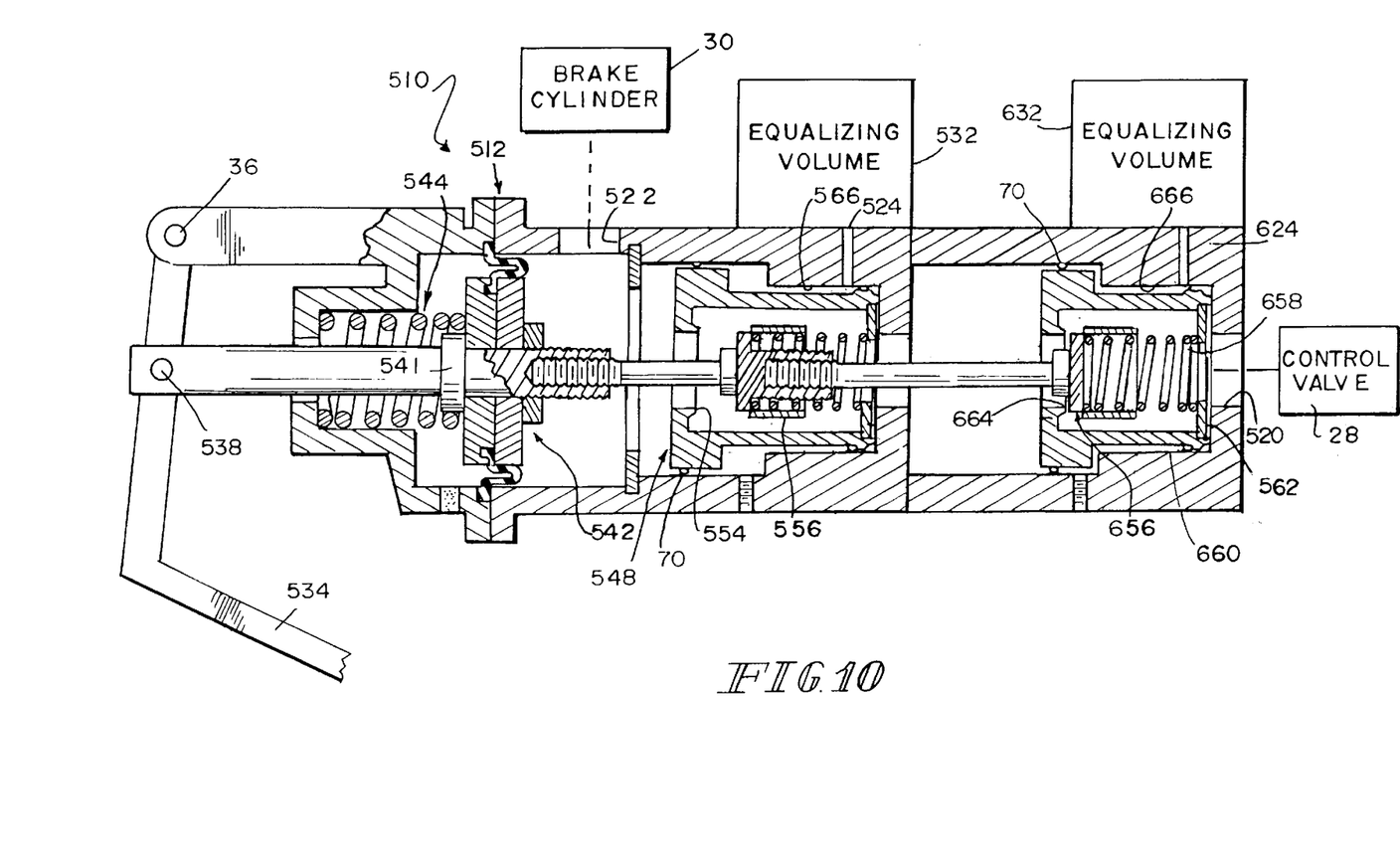
FIG. 10 shows the valve of FIG. 7 above both switch points.

When the load of the car is above the switchover point for both proportioning valves 548, 648, neither of the ratio pistons will proportion. As shown in FIG. 10, the valve elements 556, 656 are displaced from their valve seats 554, 654. Thus, the full brake signal for control valve 28 is provided to the brake cylinder 30. The position of the sensing piston 542 holds the valving elements off their respective seats. Neither equalization reservoirs 532, 632 are connected to the brake signal.

The load value of the switchover of each of the ratio pistons 548, 648 are set by one or more of the length of the actuator rods 546, 646, the position of the equalizing volume ports 524, 624 and the dimensions of the load sensing arm lever 534.

Figure 11:
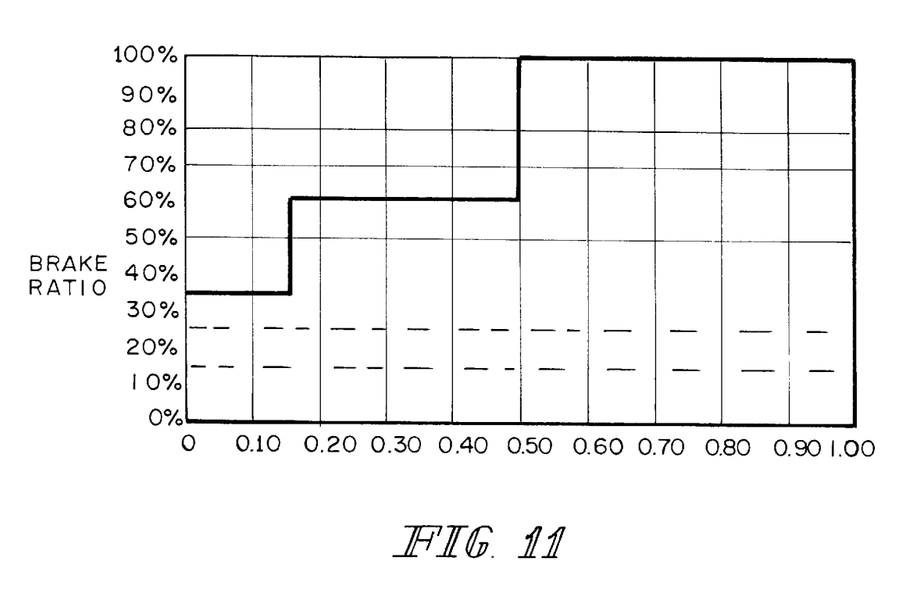
FIG. 11 is a graph illustrating the percentage of brake signal pressure versus percentage of load, according to the principles of the present invention.

The illustration of the percentage of brake signal versus percentage of truck load is illustrated in FIG. 11 using the example of FIG. 2, wherein the ratio valve proportion 60 percent and the switchover points are 15 percent of load and 50 percent of load, respectively. As for loads below 15 percent, the percentage of brake signal which reaches the brake cylinders 30 is 36 percent. After the switchover point of 15 percent, only one of the ratio pistons operates. Thus, the signal provided from the control valve to the brake cylinder is 60 percent. Once the load is above 50 percent or the switchover points of both of the load sensing devices, the full value of the brake signal from the brake control valve 28 to the brake cylinder 30 is provided.

Although the present invention has been described and illustrated in detail, it is to be clearly understood that this is done by way of illustration and example only and is not to be taken by way of limitation. The spirit and scope of the present invention are to be limited only by the terms of the appended claims.

What is claimed:

1. A brake system for a rail vehicle having a control valve providing a brake signal to a brake cylinder via a load sensing system which senses the load of the vehicle, the load sensing system comprising:

a first load sensing device receiving the brake signal from the control valve and providing a first braking signal for loads above a first load value and a second braking signal less than the first braking signal for loads below the first load value; and a second load sensing device receiving the first and second braking signals from the first load sensing device and providing a third braking signal to the brake cylinder for loads above a second load value different from the first load value and a fourth braking signal less than the third braking signal for loads below the second load value.

2. The brake system according to claim 1, wherein for loads above the first and second load values, the first and third braking signals are equal to the brake signal.

3. The brake system according to claim 2, wherein for loads above the second load value, the third braking signal is equal to the received first or second braking signal.

4. The brake system according to claim 1, wherein for loads above the second load value, the third braking signal is equal to the received first or second braking signal.

5. The brake system according to claim 1, including a third load sensing device receiving the third and fourth braking signals from the second load sensing device and providing a fifth braking signal to the brake cylinder for loads above a third load value different from the first and second load values and a sixth braking signal less than the fifth braking signal for loads below the third load value.

6. The brake system according to claim 1, wherein each load sensing device has a separate load sensing element.

7. The brake system according to claim 1, wherein the load sensing devices have a common load sensing element.

8. The brake system according to claim 1, wherein the load sensing devices are in separate housings and are interconnected to a common load sensing element.

9. The brake system according to claim 1, wherein the load sensing devices are interconnected in a common housing and have a common load sensing element.

10. The brake system according to claim 1, wherein a ratio of the first and second braking signals is equal to a ratio of the third and fourth braking signals.

11. The brake system according to claim 1, wherein a ratio of the first and second braking signals is different than a ratio of the third and fourth braking signals.

12. A method of assembling a brake system for a rail vehicle having a control valve providing a brake signal to a brake cylinder via a load sensing system which senses the load of the vehicle, the method comprising:

selecting first and second load sensing devices having different load values;

connecting the first load sensing device to receive the brake signal from the control valve and to provide a first braking signal for loads above a first load value and a second braking signal less than the first braking signal for loads below the first load value; and connecting the second load sensing device to receive the first and second braking signals from the first load sensing device and to provide a third braking signal to the brake cylinder for loads above a second load value and a fourth braking signal less than the third braking signal for loads below the second load value.

* * * * *